US012638171B2

(12) United States Patent
Jeong et al.

(10) Patent No.: US 12,638,171 B2
(45) Date of Patent: May 26, 2026

(54) INTEGRATED CONTROL LOGIC DEVICE AND OPERATING METHOD THEREOF TO CONTROL WATER LEVEL OF STEAM GENERATOR OF NUCLEAR POWER PLANT

(71) Applicant: KEPCO ENGINEERING & CONSTRUCTION COMPANY, INC., Gyeongsangbuk-do (KR)

(72) Inventors: See Chae Jeong, Uiwang-si (KR); In Ho Song, Gimcheon-si (KR); Myung Jun Song, Yuseong-gu (KR); Jae Young Huh, Seo-gu (KR); Gyu Cheon Lee, Yuseong-gu (KR)

(73) Assignee: KEPCO ENGINEERING & CONSTRUCTION COMPANY, INC., Gimcheon-si (JP)

( * ) Notice: Subject to any disclaimer, the term of this patent is extended or adjusted under 35 U.S.C. 154(b) by 743 days.

(21) Appl. No.: 17/527,601

(22) Filed: Nov. 16, 2021

(65) Prior Publication Data

US 2022/0163196 A1 May 26, 2022

(30) Foreign Application Priority Data

Nov. 23, 2020 (KR) ........................ 10-2020-0158058

(51) Int. Cl.
*F22D 5/34* (2006.01)
*F22D 5/32* (2006.01)
(Continued)

(52) U.S. Cl.
CPC ................. *F22D 5/34* (2013.01); *F22D 5/32* (2013.01); *G05B 19/05* (2013.01); *G21C 1/32* (2013.01);
(Continued)

(58) Field of Classification Search
CPC .... F22D 5/34; F22D 5/32; G21C 1/32; G05B 19/05; G05B 2219/13095; G05B 2219/161; G21D 3/001; F22B 35/004
(Continued)

(56) References Cited

U.S. PATENT DOCUMENTS 4,424,186 A * 1/1984 Cook ........................ F22D 5/26
376/211
4,777,009 A * 10/1988 Singh ........................ G21D 3/10
376/211

(Continued)

FOREIGN PATENT DOCUMENTS

KR     2012-0076747     7/2012
KR     10-1612059     4/2016

OTHER PUBLICATIONS

Korean Office Action (Application No. 2020-0158058) mailed Jul. 27, 2022 (11pages).

*Primary Examiner* — Jack W Keith
*Assistant Examiner* — Daniel Wasil
(74) *Attorney, Agent, or Firm* — NIXON PEABODY LLP; Jeffrey L. Costellia

(57) ABSTRACT

An integrated control logic device and an operating method thereof adjust a position of a main control valve and a position of an auxiliary control valve. In particular, the position of the auxiliary control valve is adjusted by determining whether a change in the position of the main control valve is in a preset deadband range, thereby preventing a periodic water level fluctuation of a steam generator of a nuclear power plant.

5 Claims, 3 Drawing Sheets

(51) Int. Cl.

| | |
|---|---|
| *G05B 19/05* | (2006.01) |
| *G21C 1/32* | (2006.01) |
| *F22B 35/00* | (2006.01) |
| *G21C 17/032* | (2006.01) |
| *G21D 3/00* | (2006.01) |

(52) U.S. Cl.
CPC .. *F22B 35/004* (2013.01); *G05B 2219/13095* (2013.01); *G05B 2219/161* (2013.01); *G21C 17/032* (2013.01); *G21D 3/001* (2013.01)

(58) Field of Classification Search
USPC ................................................. 376/211, 216
See application file for complete search history.

(56) References Cited

U.S. PATENT DOCUMENTS

| | | | |
|---|---|---|---|
| 8,811,560 | B2 | 8/2014 | Song et al. |
| 10,256,000 | B2 | 4/2019 | Song et al. |

* cited by examiner

FIG. 2

INTEGRATED CONTROL LOGIC DEVICE AND OPERATING METHOD THEREOF TO CONTROL WATER LEVEL OF STEAM GENERATOR OF NUCLEAR POWER PLANT

CROSS-REFERENCE TO RELATED APPLICATION

This application is based on and claims priority under 35 U.S.C. § 119 to Korean Patent Application No. 10-2020-0158058, filed on Nov. 23, 2020, in the Korean Intellectual Property Office, the disclosure of which is incorporated by reference herein in its entirety.

BACKGROUND

1. Field

The disclosure relates to an integrated control logic device for a main control valve and an auxiliary control valve to control a water level of a steam generator of a nuclear power plant, and an operating method of the integrated control logic device.

2. Description of the Related Art

A nuclear power plant usually includes one hundred or more systems having individual functions. The systems are largely divided into a nuclear steam supply system (NSSS) centered on a nuclear reactor, a turbine/generator system that receives stream and drives a generator to produce electricity, and other annexed equipment systems.

A pressurized light-water power plant, which currently constitutes the main type of nuclear power plants in Korea, may include a primary system centered on a nuclear reactor, a secondary system including a steam generator, a turbine, a generator, and a condenser, an engineering safety equipment system in preparation for accidents, a transmission and distribution system, a measurement control system, and other auxiliary systems.

The heat transfer of the primary and secondary systems in a nuclear power plant is configured such that, when water heated by heat generated in the nuclear reactor flows to a heat transfer pipe of the steam generator along a coolant pipe by a primary system coolant pump, heat is transferred to feedwater entering the steam generator through a secondary system pipe, and is returned to the nuclear reactor. In order for the steam generator to perform the heat transfer function safely and efficiently, a water level of the steam generator needs to be appropriately maintained within a set control range. Accordingly, stable control of the steam generator water level is one of the core functions in the operation of a nuclear power plant.

A steam generator water level control system performs automatic control on the basis of the steam generator water level, a feedwater flow rate, and a steam flow rate as input signals, by using a proportional integral (PI) controller to drive a main control valve, an auxiliary control valve, and a feedwater pump such that the steam generator water level is maintained around a set value. The main control valve, which has a large flow capacity, generally shows a relatively large amount of stiction per a general characteristic of control valves, which gives an adverse effect on a stable water level control. As a result, in the case of APR1400, there is a periodic water level fluctuation problem of a magnitude of about 2% to about 4% with respect to a water level setpoint value in a steady state operation of a 100% reactor power.

SUMMARY

Provided are a steam generator water level control system for adjusting a position of a main control valve and a position of an auxiliary control valve, particularly by compensating a position to be applied to the auxiliary control valve by determining whether a change in the position applied to the main control valve belongs to a deadband, thereby preventing occurrence of a water level fluctuation due to stiction of the main control valve, and a water level control method.

Additional aspects will be set forth in part in the description which follows and, in part, will be apparent from the description, or may be learned by practice of the presented embodiments of the disclosure.

According to an aspect of the disclosure, an integrated control logic device for a main control valve and an auxiliary control valve to control a water level of a steam generator of a nuclear power plant, includes input signal processors for a steam generator water level, a feedwater flow rate signal, a steam flow rate signal, and a nuclear reactor power signal; a water level setpoint value processor for the calculation of water level setpoint based on a nuclear reactor power signal; a proportional-integral (PI) type of master controller to generate a main control signal using processed system inputs and derived level setpoint; a feedwater pump speed determination unit to calculate a speed of a feedwater pump based on the master controller output; a valve position calculation unit for the generation of the first auxiliary control valve position demand signal based on the master controller output; a valve position calculation unit for the generation of the first main control valve position demand signal based on the master controller output signal; a hysteresis function unit to generate the second main control valve position demand signal by applying a hysteresis function with adjustable deadband to the first main control valve position opening demand signal, and transmit the second main control valve opening demand signal to the main control valve; an auxiliary control valve position compensation unit to generate an auxiliary control valve compensation signal by converting the position deviation of the main control valve with the amount of difference between the first position demand and the second position demand for the main control valve, caused by the hysteresis function unit, into the adjustment value of the auxiliary control valve position; and an auxiliary control valve opening selection unit configured to generate the second auxiliary control valve position demand signal to be transmitted to the auxiliary control valve by selecting between the first auxiliary control valve position demand signal and the auxiliary control valve position compensation signal.

The hysteresis function unit may calculate the output in a way that the second position demand signal follows the first position demand signal of the main control valve if the first main control valve control signal exceeds the provided deadband range, when the first main control valve control signal stays within the provided the deadband range, the second main control valve position remains constant and the differential value between the first main and the second main control valve demand signals is used by the auxiliary valve position compensation unit for the compensation of the main control valve positon.

A computer program according to an embodiment of the disclosure may be stored in a medium to implement, by using a computer, any one of methods according to an embodiment of the disclosure.

In addition, other methods to implement the disclosure, other systems, and a computer-readable recording medium having recorded thereon a computer program to execute the methods are further provided.

Other aspects, features, and advantages than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which

FIG. 2 is a block diagram of a steam generator water level control system for preventing water level fluctuation in a nuclear power plant, according to an embodiment of the disclosure;

DETAILED DESCRIPTION

Figure 1:
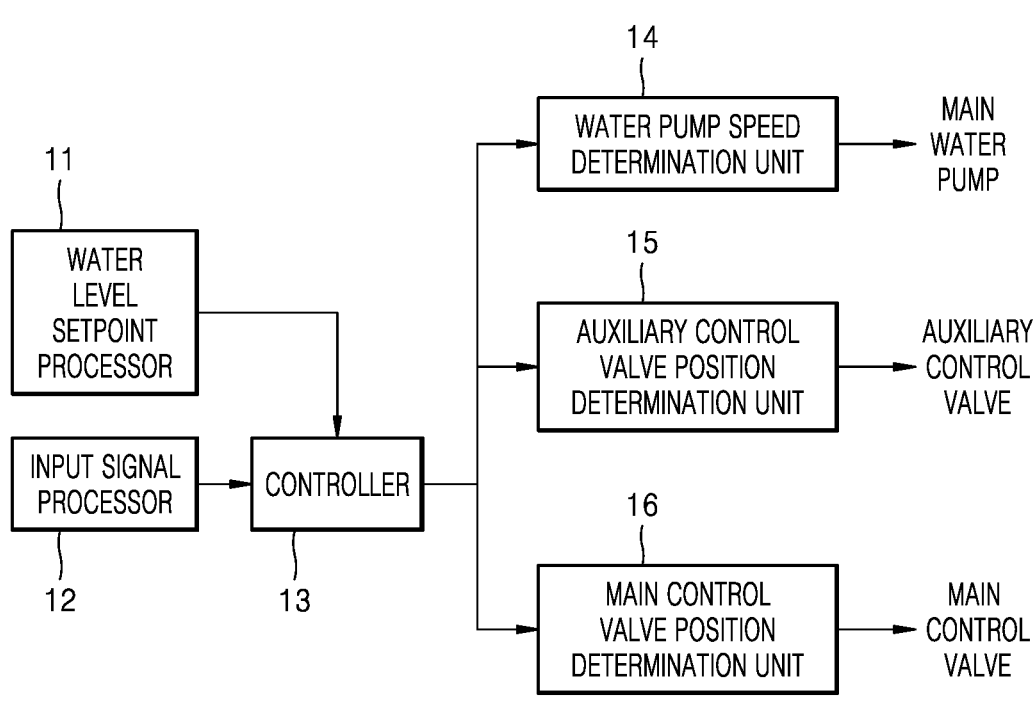
FIG. 1 is a block diagram of a control logic configuration of a steam generator water level control system according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure will be clearer referring to the detailed descriptions below with the drawings.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, exemplary embodiments will be described in detail with reference to the accompanying drawings, and in the description with reference to the drawings, the same or corresponding constituents are indicated by the same reference numerals and redundant descriptions thereof are omitted.

In the specification, herein, terms such as "learning", "learning", etc. are not intended to refer to mental actions such as human educational activities, but are interpreted as terms referring to performing machine learning through computing according to procedures.

In the embodiment below, it will be understood that although the terms "first," "second," etc. may be used herein to describe various components, these components should not be limited by these terms. These components are only used to distinguish one component from another.

In the embodiment below, as used herein, the singular forms "a," "an" and "the" are intended to include the plural forms as well, unless the context clearly indicates otherwise.

In the embodiment below, it will be further understood that the terms "includes" and/or "including" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

According to an embodiment of the disclosure, a controller of a steam generator water level control system of a nuclear power plant may perform automatic control with a steam generator water level, a feedwater flow rate, a steam flow rate, and a nuclear reactor power as inputs. As the controller with respect to a steam generator drives a main control valve, an auxiliary control valve, and a feedwater pump using an output, a water level of the steam generator may be controlled to be maintained around a set value.

During an operation of the nuclear power plant, stiction may be alleviated through maintenance and repair of the main control valve. The water level may be adjusted by the auxiliary control valve having a relatively small capacity while limiting the movement of the main control valve with a hysteresis function in a steady state operation.

In the steady state operation, in the case in which a wide range of a feedwater flow rate control is not required, when the water level is maintained around a water level setpoint value, the water level may be controlled with the auxiliary control valve in a way that the adjustment of opening of the main control valve is minimized. When the water level goes into the transient state, the water level may be mainly control by the main control valve.

When a position of the main control valve is maintained within the deadband of hysteresis function, the water level of the steam generator may be controlled with only the adjustment of the opening of the auxiliary control valve.

The steam generator water level control system and water level control method according to an embodiment of the disclosure may be applied to most nuclear power plants such as of WEC nuclear power plants, e.g., OPR1000, APR1400, Kori units 2, 3, and 4, Yeonggwang units 1 and 2, and the like, and the export type APR1000 nuclear power plant and the like. In addition, as the steam generator water level control system and water level control method according to an embodiment of the disclosure can be applied.

FIG. 1 is a block diagram of a control logic configuration of a steam generator water level control system according to the related art.

The control logic configuration diagram of the steam generator water level control system according to the related art may include a water level setpoint value processor 11 that calculates a water level setpoint value using a nuclear reactor power signal, and an input signal processor 12 that receives inputs of a steam generator water level, a feedwater flow rate, a steam flow rate, and a nuclear reactor power and processes input signals thereof.

A controller 13 may generate a main control signal using the input signals and the water level setpoint value.

A feedwater pump speed determination unit 14 may calculate a speed of a feedwater pump based on the main control signal.

An auxiliary control valve position determination unit 15 may generate a first auxiliary control valve position demand signal based on the main control signal, and transmit the generated signal to an auxiliary control valve.

A main control valve position determination unit 16 may generate a first main control valve opening demand signal based on the main control signal, and transmit the generated signal to a main control valve.

According to the control logic configuration diagram of the steam generator water level control system according to the related art, as a control signal to drive the main control valve, the auxiliary control valve, and the feedwater pump is generated based on the main control signal, the steam generator water level may be maintained around a set value. In the steam generator water level control system according to the related art, when water level is only controlled by the main control valve for the high power mode above 20% of power, a fluctuation phenomenon of the steam generator water level in a steady state occurs due to stiction of the main control valve.

Although efforts have been made to reduce a stiction of the main control valve by performing maintenance and repair during the operation of a nuclear power plant, there were clear limitations.

Accordingly, according to embodiments of the disclosure, to solve the above problem, proposed is a method by which a movement of the main control valve is reduced during steady state operation and adjustment control may be performed with the auxiliary control valve having a relatively small capacity.

Accordingly, the life of the main control valve may be extended, and the cost of replacing the main control valve may be reduced.

The steam generator water level control system of the nuclear power plant according to the related art performs automatic control on the basis of the steam generator water level, the feedwater flow rate, and the steam flow rate as input signals, by using a proportional integral (PI) controller to drive the main control valve, the auxiliary control valve, and the feedwater pump such that the steam generator water level is maintained around a setpoint value.

For the high power mode above 20% of reactor power, for example, while the auxiliary control valve is operated at a fixed position, the water level may be controlled using the main control valve only.

The main control valve having large flow capacity generally shows a relatively large effect of stiction that is known as general characteristic of control valves. As a result, in the case of APR1400, periodic water level fluctuation with magnitude of about 2 to 4% around the water level setpoint has been observed in a steady state operation at 100% nuclear reactor power.

The control valves such as steam generator main control valves or auxiliary control valves generally have stiction including non-linear behavior characteristics such as hysteresis, a deadband, backlash, a deadzone, and the like.

The adjustment control valve such as the main control valve, the auxiliary control valve, and the like have a limitation in accuracy of a position adjustment for the applied valve position demand signal. Considering this kind of accuracy limitation of control valves, when a process control loop is designed including control valves, it is necessary to evaluate the effect of the stiction of applied control valve.

In case of the APR1400 operation, periodical fluctuation of maximum ±4% caused by the stiction of the main control valve during the steady state power above 20% has been observed.

To explain the stiction in detail, when the setpoint value of the steam generator water level is 50% and a currently measured value is 46%, the controller 13 of the steam generator water level control system may gradually increase an output to adjust the steam generator water level to be same to the setpoint value of 50%. In this case, as a controller output is increased greater than a certain value or more, the position of the main control valve stayed in same position due to stiction of a valve may be quickly moved to a new position with stepwise fashion. Due to the stiction of the main control valve, the position of the main control valve with a large capacity may generate a larger amount of feedwater than a feedwater flow rate required to maintain the steam generator water level in an equilibrium state at setpoint value. As a slightly larger rate than a required feedwater flow rate is formed with a position of the main control valve, the water level of the steam generator may be increased when a certain time has elapsed. In this case, the water level may be increased up to 54% exceeding the setpoint value of 50%.

After the output of the controller is reduced and maintained for certain duration, the position of the main control valve is lowered stepwise so to result in insufficient feedwater condition. In this case, the water level of the steam generator may be decreased lower than the water level setpoint value.

Accordingly, a phenomenon may occur, in which the water level of the steam generator fluctuates with a maximum 50±4% amplitude at a cycle of about 2 minutes during a 100% power operation.

If the water level of the steam generator has a significant fluctuation, it may violate acceptance criteria for the control performance of the steam generator water level, or a feedwater flow rate signal used as a major input for the calculation of a secondary system calorimetric power may fluctuate significantly, which may challenge to reduce the operational margin of the nuclear power plant.

Furthermore, in a process of performing regular maintenance and repair on the main control valve, much efforts and man power are needed to reduce the stiction of a valve.

Figure 2:
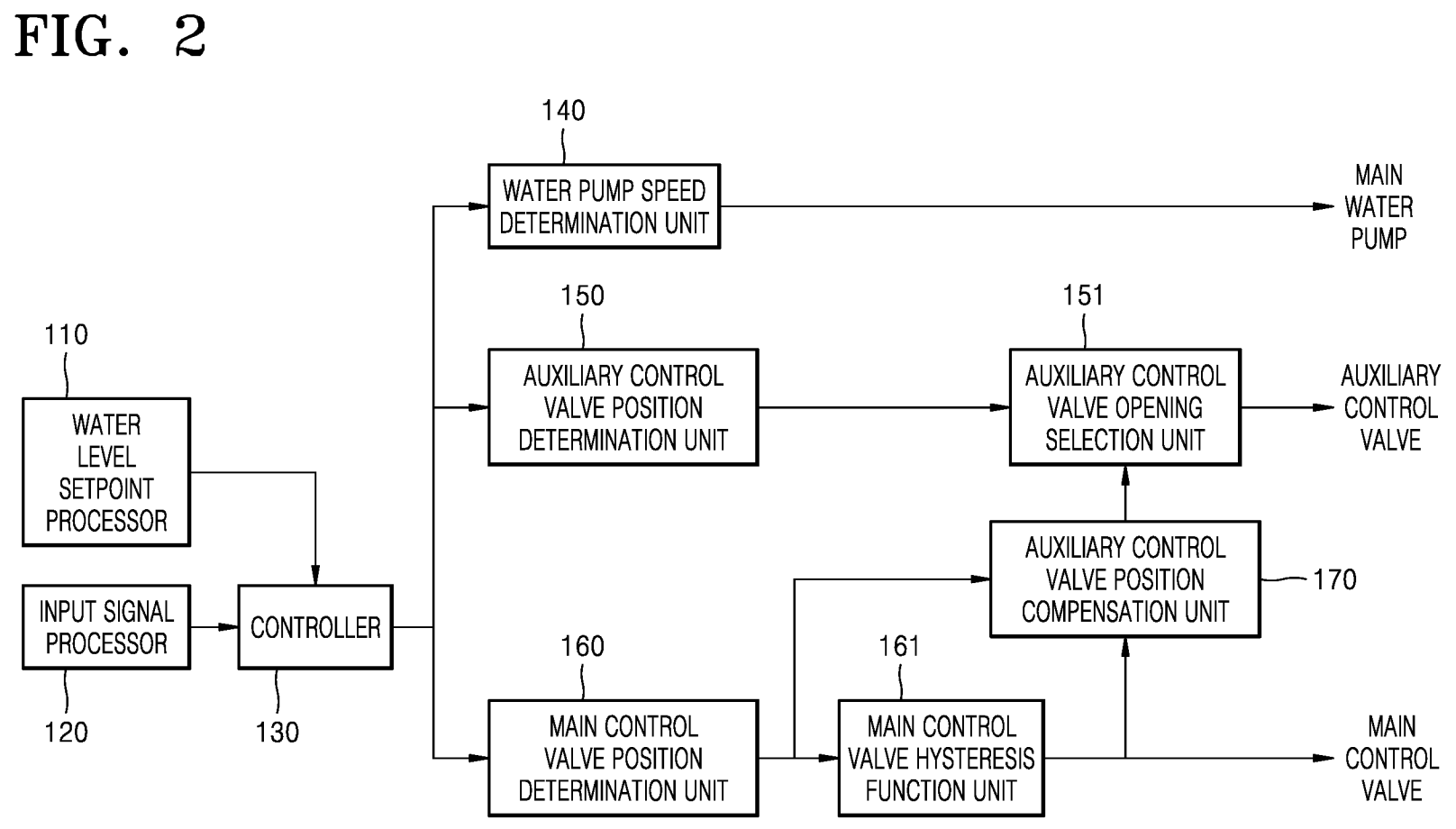

FIG. 2 is a block diagram of a steam generator water level control system for preventing water level fluctuation in a nuclear power plant, an embodiment of the disclosures.

According to embodiments of the disclosure, for the steady state operations which a large scale of feedwater flow rate adjustment is not required, the main control valve with a relatively large adjustment capacity stops moving when plant operation approaches to the equilibrium state. Adjustment control may be performed using the auxiliary control valve with a relatively small adjustment capacity. Furthermore, according to embodiments of the disclosure, the effect by the stiction characteristics of the main control valve may be minimized.

According to embodiments of the disclosure, the stability of the water level control logic of the steam generator may be increased by performing the adjustment control using the auxiliary control valve during the steady state operation while securing the control performance according to the related art when a transient event occurs.

According to the embodiments, when the transient event occurs, a large feedwater flow rate change is required, the feedwater flow rate may be controlled using the main control valve with a large adjustment capacity in a control mode of the transient condition.

Then, when the transient event or condition is over and the steady state is started, an integrated valve control logic device may receive a position demand signal with small variance, and included hysteresis function calculates its output by applying analog deadband function for the position demand signal. The amount of deadband refers to the degree to which the main control valve dose not move and the water level can be adjusted by the auxiliary control valve. The position demand signal of main control valve may be further provided by a hysteresis function to determine a deadband.

The integrated valve control logic device may generate an auxiliary control valve position compensation signal to adjust the position of the auxiliary control valve by compensating a difference value between an input signal (a first main control valve position demand signal) and an output signal (a second main control valve position demand signal) of the hysteresis function to determine a deadband. Furthermore, in this case, the integrated valve control logic device generates the auxiliary control valve position compensation signal through a predefined auxiliary control valve compensation program, and transmits the auxiliary control valve position compensation signal to the auxiliary control valve, thereby controlling the auxiliary control valve. Herein, the auxiliary control valve compensation program may generate a valve position, which covers the range of ±50% with the central position at 50%, and may perform adjustment control using the auxiliary control valve in lieu of the main control valve.

According to the embodiments, a maximum valve position range where the stiction of the main control valve occurs (5% for APR1400) is set, and a range of a deadband may be set based on the maximum valve position range. The range of a deadband setpoint value can be adjusted by maintenance staff.

When a change of a reactor power by a controller 130 is less than or equal to a preset reference range, for example, 20%, adjustment may be performed using only the auxiliary control valve, whereas the main control valve is closed and not used for the control. When the adjustment is performed with the auxiliary control valve only, a main control valve hysteresis function unit 161 may not generated a second main control valve opening demand signal. The main control valve hysteresis function unit 161 may calculate the second main control valve opening demand signal by applying a hysteresis algorithm capable of setting a deadband to the first main control valve opening demand signal.

According to the embodiments, a deadband setpoint value to the main control valve may be set to, for example, 5%. In this case, the auxiliary control valve compensation program may calculate an error value of a position demand signal with respect to the generated main control valve.

According to the embodiments, adjustment control may be performed using the auxiliary control valve. The stiction of the auxiliary control valve is merely ⅕ of the stiction of the main control valve, and may perform the water level control with five times precision, compared with the main control valve.

The auxiliary control valve compensation program may be implemented as a relational expression of one or more continuous line segments. The input data of the compensation program may be optimized such that the total feedwater flow rate controlled by the integrated valve control logic device is linearly proportional to the output of the controller 130 as much as possible. According to embodiments of the disclosure, the steam generator water level control system may be capable of performing continuous and linear feedwater flow rate control.

A water level setpoint value processor 110 calculates a water level setpoint value of the steam generator using the nuclear reactor power signal. The water level setpoint value of the steam generator refers to an optimal water level of the steam generator based on a reactor power signal.

The controller 130 generates a main control signal using result values of the input signal processor 120 and the water level setpoint value processor 110.

A feedwater pump speed determination unit 140 calculates the speed of the feedwater pump based on the main control signal. In this state, the feedwater pump speed determination unit 140 may calculate the speed of the feedwater pump based on the main control signal using a table, a relationship formula, an algorithm, and the like, which indicates a correlation between the main control signal and the speed of the feedwater pump.

An auxiliary control valve position determination unit 150 generates the first auxiliary control valve position demand signal based on the main control signal. The auxiliary control valve position determination unit 150 may generate the auxiliary control valve position demand signal based on the main control signal using a table, a relationship formula, an algorithm, and the like, which indicates a correlation between the main control signal and the auxiliary control valve position demand signal.

A main control valve position determination unit 160 calculates the first main control valve position demand signal based on the main control signal. The auxiliary control valve position determination unit 150 may generate the first main control valve position demand signal based on the main control signal that is input, using a table, a relationship formula, an algorithm, and the like, which indicates a correlation between the main control signals and the main control valve position demand signals.

The main control valve hysteresis function unit 161 may generate the second main control valve opening demand signal based on the first main control valve position demand signal. The second main control valve position demand signal may be determined on the basis of deadband setpoint of hysteresis function. The generated second main control valve position demand signal may be transmitted to the main control valve.

An auxiliary control valve position compensation unit 170 receives the first main control valve position demand signal and the second main control valve position demand signal generated by the main control valve hysteresis function unit 161, and generates the auxiliary control valve position compensation signal that converts a difference value between the first and second main control valve position demand signals into an opening adjustment of the auxiliary control valve.

The auxiliary control valve position compensation unit 170 may calculate a compensation signal of the auxiliary control valve with inputs of the first main control valve opening demand signal and the second main control valve demand signal, using a table, a relationship formula, an algorithm, and the like, which indicates a correlation with the output.

An auxiliary control valve opening selection unit 151 receives the first auxiliary control valve position demand signal, receives the auxiliary control valve position compensation signal, and generates a second auxiliary control valve position demand signal to be transmitted to the auxiliary control valve.

Figure 3:
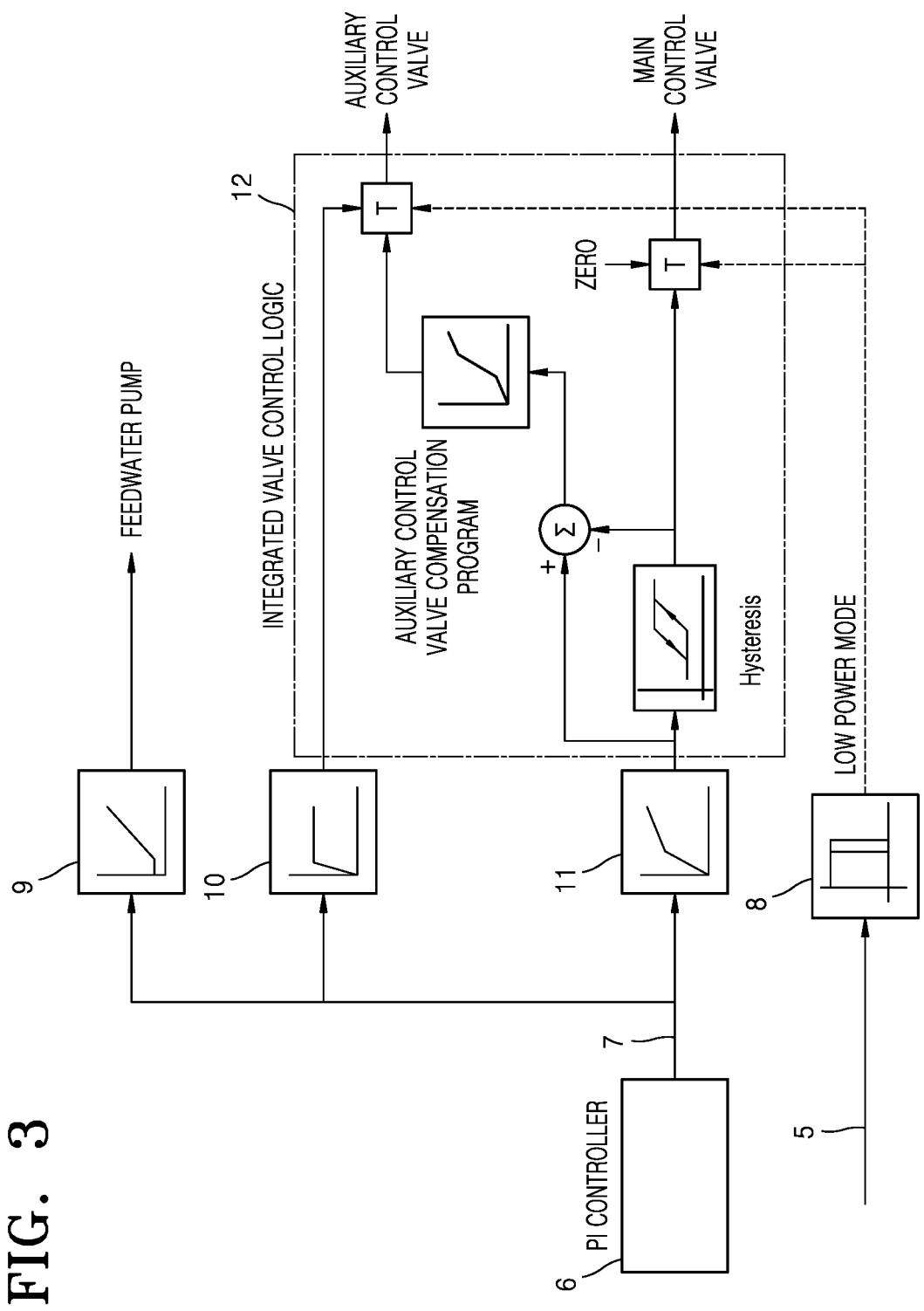
FIG. 3 is a block diagram of a steam generator water level control system according to embodiments of the disclosure.

FIG. 3 is a block diagram of a water level control system of the steam generator, according to embodiments of the disclosure.

According to embodiments of the disclosure, for the steady state operations which a large scale of feedwater flow rate adjustment is not required, the main control valve with a relatively large adjustment capacity stops moving when plant operation approaches to the equilibrium state, and adjustment control may be performed using the auxiliary control valve with a relatively small adjustment capacity. Furthermore, according to embodiments of the disclosure, the effect by the stiction characteristics of the main control valve may be minimized.

According to embodiments of the disclosure, the stability of the water level control logic of the steam generator may be increased by performing the adjustment control using the auxiliary control valve during the steady state operation while securing the control performance according to the related art when a transient event occurs.

According to the embodiments, when the transient event occurs, a large feedwater flow rate change is required, the feedwater flow rate may be controlled using the main control valve with a large adjustment capacity in a control mode of the transient condition.

Then, when the transient event or condition is over and the steady state is started, an integrated valve control logic device may receive a position demand signal with small variance, and included hysteresis function calculates its output by applying analog deadband function for the position demand signal. The amount of deadband refers to the degree to which the main control valve dose not move and the water level can be adjusted by the auxiliary control valve. The position demand signal of main control valve may be further provided by a hysteresis function to determine a deadband.

An integrated valve control logic 12 may adjust the position of the auxiliary control valve corresponding to a difference value between an input signal and an output signal of the hysteresis function to determine a deadband. Furthermore, In this case, the integrated valve control logic 12 controls the auxiliary control valve through the predefined auxiliary control valve compensation program. Herein, the auxiliary control valve compensation program may generate a valve position, which covers the range of ±50% with the central position at 50%, and may perform adjustment control using the auxiliary control valve in lieu of the main control valve.

According to the embodiments, a maximum valve position range where the stiction of the main control valve occurs (5% for APR1400) is set, and a range of a deadband may be set based on the maximum valve position range. When an output of a PI controller 6 is changed within a preset reference range, for example, a ±5% range, the adjustment control may be performed using the auxiliary control valve only, and the main control valve is located in the vicinity of the equilibrium position, and the movement of the main control valve may be stopped.

According to the embodiments, a deadband setpoint value to the main control valve may be set to, for example, 5%. The auxiliary control valve compensation program may calculate an error value of a position demand signal with respect to the generated main control valve.

According to the embodiments, adjustment control may be performed using the auxiliary control valve. The stiction of the auxiliary control valve is merely ⅕ of the stiction of the main control valve, and may perform the water level control with five times precision, compared with the main control valve.

The auxiliary control valve compensation program may be implemented as a relational expression of one or more continuous line segments. The input data of the compensation program may be optimized such that the total feedwater flow rate controlled by the integrated valve control logic device 12 is linearly proportional to the output of the PI controller 6 as much as possible. According to embodiments of the disclosure, the steam generator water level control system may be capable of performing continuous and linear feedwater flow rate control.

The above-described device may be implemented by a hardware constituent element, a software constituent element, and/or a combination of the hardware constituent element and the software constituent element. For example, the device and constituent elements described in the embodiments may be implemented using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. A processing device may execute an operating system (OS) and one or more software applications executed on the operating system. Furthermore, the processing device, in response to the execution of software, may access, store, manipulate, process, and generate data. For convenience of understanding, although one processing device is sometimes described as being used, it may be seen that one of ordinary skill in the art would know that the processing device may include a plurality of processing elements and/or a plurality of types of processing elements. For example, the processing device may include a plurality of processors or one processor and one controller. Furthermore, another processing configuration such as a parallel processor is possible.

Software may include computer programs, codes, instructions, or one or more combinations thereof, and configure a processing device to operate as desired, or independently or collectively instruct the processing device. To be interpreted by the processing device or provide commands or data to the processing device, software and/or data may be permanently or temporarily embodied in a certain type of machine, components, physical devices, virtual equipment, computer storage media or devices, or transmitted signal waves. Software is distributed over networked computer systems to be stored or executed by a distributed method. The software and data may be stored in one or more computer-readable recording media.

The method according to the embodiment may be implemented in the form of a program command that can be executed through various computer means and recorded in a computer-readable medium. The computer-readable medium may include program instructions, data files, data structures, and the like alone or in combination. The program instructions recorded in the medium may be specially designed and constructed for embodiments, or may be known and available to a person skilled in the art of computer software. Examples of the computer-readable recording medium include specially configured hardware devices to store and execute program instructions, such as magnetic media, e.g., floppy disks, hard disks, and magnetic tapes, optical recording media, e.g., CD-ROMs or DVDs, magneto-optical media such as floptical disks, ROM, RAM, flash memory, and the like. Examples of the program instructions may include not only machine codes created by a compiler but also high-water level programming language executable by a computer using an interpreter. The above-described hardware devices may be configured to operate as one or more software modules to perform operations according to various embodiments of the disclosure, or vice versa.

In the above, although the present disclosure has been described by specific matters such as specific constituent elements or the like, limited embodiments, and the drawings, those skilled in the art to which the present disclosure pertains could make various modifications and changes from these descriptions. For example, appropriate results can be achieved even when the above-described technologies are performed in a different order from the above-described method, and/or the above-described constituent elements such as systems, structures, devices, circuits, and the like are coupled or combined in a different form from the described method, or replaced or substituted by other constituent elements or equivalents.

According to the disclosure, a position of the main control valve and a position of the auxiliary control valve are adjusted. In particular, a position to be applied to the auxiliary control valve is compensated by determining whether a change in the position applied to the main control valve belongs to a deadband, thereby preventing occurrence of a water level fluctuation due to stiction of the main control valve Furthermore, according to the disclosure, a position of the main control valve and a position of the auxiliary control valve are adjusted, particularly by determining whether a change in the position applied to the main control valve varys within the range of a deadband. The movement of the main control valve in a steady state operation may be minimized and adjustment control may be performed with the auxiliary control valve having a relatively small capacity.

Furthermore, according to the disclosure, the stability of the water level control logic of the steam generator may be increased by performing the adjustment control using the auxiliary control valve during the steady state operation while securing the control performance according to the related art when a transient event occurs.

Furthermore, according to the disclosure, the stiction of the auxiliary control valve is merely ⅕ of the stiction of the main control valve, and may perform the water level control with five times precision, compared with the main control valve.

Furthermore, according to the disclosure, as a result of adjusting the water level through the auxiliary control valve, the usage of the main control valve may be minimized so that life of the main control valve may be extended, and the cost of replacing the main control valve may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An integrated control logic device for a main control valve and an auxiliary control valve to control a water level of a steam generator of a nuclear power plant,

a feedwater flow rate adjustment capacity of the main control valve being greater than that of the auxiliary control valve, the integrated control logic device comprising at least one processor including a plurality of functional units including:

input signal processing unit configured to receive a steam generator water level value, feedwater flow rate value, steam flow rate value, and a nuclear reactor power value;

a water level setpoint value processing unit configured to calculate a water level setpoint value based on the nuclear reactor power value;

a proportional-integral type control unit configured to generate a main control value using the steam generator water level value, the feedwater flow rate value, the steam flow rate value, and the water level setpoint value;

an auxiliary control valve opening determination unit configured to determine a first auxiliary control valve opening demand value based on the main control value;

a main control valve opening determination unit configured to calculate a first main control valve opening demand value based on the main control value;

a main control valve hysteresis function unit configured to calculate a second main control valve opening demand value on the basis of a main control valve deadband setpoint value and the first main control valve opening demand value, and adjust opening degree of the main control valve according to the second main control valve opening demand value;

an auxiliary control valve opening compensation unit configured to calculate an auxiliary control valve opening compensation value on the basis of a difference between the first main control valve opening demand value and the second main control valve opening demand value; and an auxiliary control valve opening demand selection unit configured to calculate a second auxiliary control valve opening demand value on the basis of the first auxiliary control valve opening demand value and the auxiliary control valve opening compensation value, and adjust opening degree of the auxiliary control valve according to the second auxiliary control valve opening demand value, wherein the main control valve hysteresis function unit is further configured to:

set the main control valve deadband setpoint value based on a maximum value of a valve opening range where a stiction of the main control valve occurs, determine a deadband range based on the main control valve deadband setpoint value, when the first main control valve opening demand value changes within the deadband range,
maintain the second main control valve opening demand value, and when the first main control valve opening demand value changes beyond the deadband range,
change the second main control valve opening demand value as the changed first main control valve opening demand value.

2. The integrated control logic device of claim 1, further comprising a feedwater pump speed determination unit configured to determine a speed of a feedwater pump based on the main control value and adjust the speed of the feedwater pump according to the determined speed.

3. A method of operating an integrated control logic device for a main control valve and an auxiliary control valve to control a water level of a steam generator of a nuclear power plant, a feedwater flow rate adjustment capacity of the main control valve being greater than that of the auxiliary control valve, the integrated control logic device comprising at least one processor including a plurality of functional units including an input signal processing unit, a water level setpoint value processing unit, a proportional-integral type control unit, an auxiliary control valve opening determination unit, a main control valve opening determination unit, a main control valve hysteresis function unit, an auxiliary control valve opening compensation unit, and an auxiliary control valve opening demand selection unit, the operating method comprising:

receiving, by the input signal processing unit, a steam generator water level value, a feedwater flow rate value, a steam flow rate value, and a nuclear reactor power value;

calculating, by the water level setpoint value processing unit, a water level setpoint value based on the nuclear reactor power value;

generating, by the proportional-integral type control unit, a main control value using the steam generator water level value, the feedwater flow rate value, the steam flow rate value, and the water level setpoint value;

determining, by the auxiliary control valve opening determination unit, a first auxiliary control valve opening demand value based on the main control value;

determining, by the main control valve opening determination unit, a first main control valve opening demand value based on the main control value;

calculating, by the main control valve hysteresis function unit, a second main control valve opening demand value on the basis of a main control valve deadband setpoint value and the first main control valve opening demand value, and adjusting opening degree of the main control valve according to the second main control valve opening demand value;

calculating, by the auxiliary control valve opening compensation unit, an auxiliary control valve opening compensation value based on a difference between the first main control valve opening demand value and the second main control valve opening demand value; and calculating, by the auxiliary control valve opening demand selection unit, a second auxiliary control valve opening demand value on the basis of the first auxiliary control valve opening demand value and the auxiliary control valve opening compensation value, and adjusting opening degree of the auxiliary control valve according to the second auxiliary control valve opening demand value;

wherein the calculating of the second main control valve opening demand value comprises:

setting the main control valve deadband setpoint value based on a maximum value of a valve opening range where a stiction of the main control valve occurs, determining a deadband range based on the main control valve deadband setpoint value, when the first main control valve opening demand value changes within the deadband range, maintaining the second main control valve opening demand value, and when the first main control valve opening demand value changes beyond the deadband range, changing the second main control valve opening demand value as the changed first main control valve opening demand value.

4. The method of claim 3, further comprising calculating, by the auxiliary control valve opening compensation unit, the auxiliary control valve opening compensation value on the basis of an input of the difference, by using a table, a relationship formula, or an algorithm.

5. The method of claim 3, further comprising determining, by a feedwater pump speed determination unit, a speed of a feedwater pump based on the main control value, and adjusting the speed to the feedwater pump according to the determined speed.

* * * * *